(12) United States Patent
Fu et al.

(10) Patent No.: US 11,494,112 B2
(45) Date of Patent: Nov. 8, 2022

(54) STORAGE DEVICE AND ACCESSING METHOD FOR OPERATION LOG THEREOF

(71) Applicant: RayMX Microelectronics Corp., Hefei (CN)

(72) Inventors: Yinghui Fu, Hefei (CN); Xin Liu, Anqing (CN)

(73) Assignee: RAYMX MICROELECTRONICS CORP., Hefei (CN)

( * ) Notice: Subject to any disclaimer, the term of this patent is extended or adjusted under 35 U.S.C. 154(b) by 6 days.

(21) Appl. No.: 17/386,351

(22) Filed: Jul. 27, 2021

(65) Prior Publication Data

US 2022/0100408 A1    Mar. 31, 2022

(30) Foreign Application Priority Data

Sep. 28, 2020    (CN) .......................... 202011038258.2

(51) Int. Cl.
*G06F 3/06*    (2006.01)

(52) U.S. Cl.
CPC .......... *G06F 3/0653* (2013.01); *G06F 3/0604* (2013.01); *G06F 3/0632* (2013.01);
(Continued)

(58) Field of Classification Search
CPC .... G06F 3/0653; G06F 3/0604; G06F 3/0632; G06F 3/0656; G06F 3/0659;
(Continued)

(56) References Cited

U.S. PATENT DOCUMENTS

| 6,101,229 A | 8/2000 | Glover |
| 9,390,046 B2 | 7/2016 | Wagh |

(Continued)

FOREIGN PATENT DOCUMENTS

| CN | 103597443 A | 2/2014 |
| CN | 106970886 A | 7/2017 |
| TW | 392149 B | 6/2000 |

OTHER PUBLICATIONS

TW Office Action dated May 17, 2021 in Taiwan application No. 109136047.

*Primary Examiner* — Hiep T Nguyen
(74) *Attorney, Agent, or Firm* — McClure, Qualey & Rodack, LLP

(57) ABSTRACT

Disclosed is a method for maintaining operation log information stored in a non-volatile memory of a storage device. The method includes the steps of: configuring a buffer area of a volatile memory; caching the operation log information into the buffer area; writing the operation log information stored in the buffer area into a predetermined storage area of the non-volatile memory; repeatedly updating the operation log information to the predetermined storage area; and initializing the storage device, which includes the following steps of enabling a watchdog timer in a controller; fetching the latest operation log information by reading the predetermined storage area when the watchdog timer counts a predetermined time and the storage device does not complete the initialization; configuring the storage device to perform a force low-level formatting after the latest operation log information is fetched; and disabling the watchdog timer when the storage device completes the initialization.

18 Claims, 4 Drawing Sheets

(52) U.S. Cl.
CPC .......... *G06F 3/0656* (2013.01); *G06F 3/0659* (2013.01); *G06F 3/0679* (2013.01)

(58) Field of Classification Search
CPC ................. G06F 3/0679; G06F 3/0619; G06F 2212/7203; G06F 12/0246; G06F 16/128; G06F 16/13; G06F 16/172; G06F 16/1815

See application file for complete search history.

(56) References Cited

U.S. PATENT DOCUMENTS

| | | | |
|---|---|---|---|
| 9,405,668 B1* | 8/2016 | Fallone | G06F 12/00 |
| 10,216,429 B2* | 2/2019 | Ash | G06F 3/0643 |
| 10,803,970 B2 | 10/2020 | Schuh et al. | |
| 2006/0206538 A1* | 9/2006 | Veazey | G06F 16/2358 |
| 2009/0254572 A1 | 10/2009 | Redlich et al. | |
| 2011/0218971 A1* | 9/2011 | Cooper | G06F 16/00 |
| | | | 707/689 |
| 2014/0163716 A1* | 6/2014 | Chang | G06F 1/26 |
| | | | 700/117 |
| 2015/0134926 A1 | 5/2015 | Yang et al. | |
| 2015/0143170 A1* | 5/2015 | Andrews | G06F 3/0619 |
| | | | 714/15 |
| 2016/0300069 A1* | 10/2016 | Anil | G06F 21/62 |
| 2017/0060692 A1* | 3/2017 | Huang | G06F 11/142 |
| 2020/0286575 A1* | 9/2020 | Chang | G11C 29/12005 |
| 2021/0389882 A1* | 12/2021 | Zhou | G06F 3/0659 |

* cited by examiner

STORAGE DEVICE AND ACCESSING METHOD FOR OPERATION LOG THEREOF

CROSS-REFERENCE TO RELATED APPLICATION

This application claims the priority benefit of Chinese Patent Application Serial Number CN202011038258.2, filed on Sep. 28, 2020, the full disclosure of which is incorporated herein by reference.

BACKGROUND

Technical Field

The present disclosure relates to the technical field of log recording, in particular to a method for maintaining operation log information and a storage device.

Related Art

As increasing application field of storage devices (e.g., solid-state drives (SSD)), the requirement for stability on the storage device becomes higher and higher.

In the prior art, the operation information and alarm information for a user in the storage device are recorded during the operation process. The operation log information which is used to store the operation information and alarm information is thus generated and stored in the storage device.

However, if the flash translation layer in the storage device is damaged, the storage device does not complete the initialization procedure smoothly, the OS (operating system) does not recognize this storage device and the file system in the storage device would be not recognized. Then, the operation log information in the storage device will not be read.

In addition, if the storage device is subjected to perform a low-level formatting at this time, the operation log information originally stored in the storage device will also be formatted. Thus, the operation log information may not be used to perform problem analysis on the storage device.

In the prior art, if an unpredictable phenomenon occurs in the storage device, the problem analysis may only be performed by disassembling the storage device, but such the operation log information which may be read into the storage device may not be confirmed.

Besides, since the storage device is normally packaged, if the casing needs to be disassembled for the problem analysis, the operation of disassembling the casing to perform the problem analysis is necessarily more complex.

SUMMARY

The embodiment of the present disclosure provides a method for maintaining operation log information and a storage device, which solves the problem that in the prior art the operation log information may not be read when the flash translation layer in the storage device is damaged.

In one embodiment, a method for maintaining operation log information is provided, and the operation log information stored in a non-volatile memory of a storage device. The storage device comprises a volatile memory, the non-volatile memory and a controller. The method comprises the steps of: configuring a buffer area of the volatile memory; caching the operation log information of the storage device into the buffer area of the volatile memory; writing the operation log information stored in the buffer area of the volatile memory into a predetermined storage area of the non-volatile memory; repeatedly updating the operation log information stored in the buffer area of the volatile memory to the predetermined storage area of the non-volatile memory; and initializing the storage device.

The step of initializing the storage device comprises: enabling a watchdog timer in the controller; fetching the latest operation log information by reading the predetermined storage area of the non-volatile memory when the watchdog timer counts a predetermined time and the storage device does not complete the initialization; configuring the storage device to perform a force low-level formatting after the latest operation log information is fetched; and disabling the watchdog timer when the storage device completes the initialization.

In another embodiment, a storage device is provided. The storage device comprises a volatile memory, a non-volatile memory, and a controller, and the controller is respectively coupled to the volatile memory and the non-volatile memory. The controller is configured to configure a buffer area of the volatile memory; cache operation log information into the buffer area of the volatile memory; write the operation log information stored in the buffer area into a predetermined storage area of the non-volatile memory; and repeatedly update the operation log information stored in the buffer area of the volatile memory to the non-volatile memory.

When the storage device initiates initialization, the controller is configured to enable a watchdog timer in the controller; fetch the latest operation log information by reading the predetermined storage area of the non-volatile memory when the watchdog timer counts a predetermined time; configure the storage device to perform a force low-level formatting after the latest operation log information is fetched; and disable the watchdog timer when the initialization of the storage device is completed.

In the embodiment of the present disclosure, the operation log information is recorded in a fixed location (i.e., a predetermined storage area) of the non-volatile memory during the operation process of the storage device, so that the record of the operation log information is not affected by the file system. Meanwhile, the watchdog timer is used to operate during initialization of the storage device and cooperate with the self-detection and determination mechanism of the storage device; if the storage device is found not to complete the initialization within the predetermined time, the storage device is set to be in a force low-level formatting mode, the predetermined storage area of the non-volatile memory is directly read and the latest operation log information is fetched, so that the operation log information may be fetched without disassembling the storage device. Therefore, when an unpredictable phenomenon occurs in the storage device, the operation log information may be obtained, and the cause may be analyzed through the obtained operation log information.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

Figure 1:
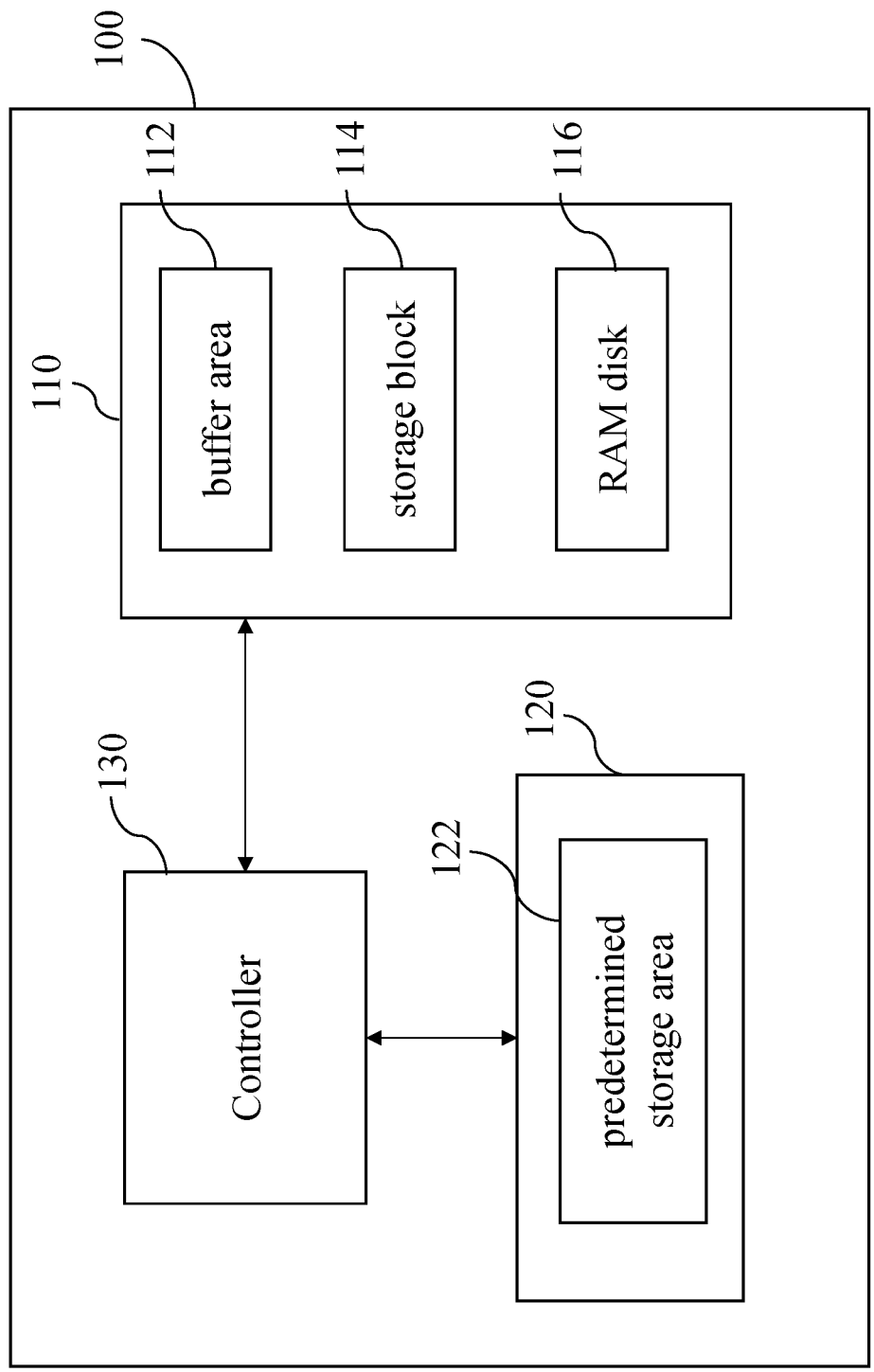
FIG. 1 is a block diagram of a storage device according to an embodiment of the present disclosure.

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to member a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

It must be understood that when a component is described as being "connected" or "coupled" to (or with) another component, it may be directly connected or coupled to other components or through an intermediate component. In contrast, when a component is described as being "directly connected" or "directly coupled" to (or with) another component, there are no intermediate components. In addition, unless specifically stated in the specification, any term in the singular case also comprises the meaning of the plural case.

In the following embodiment, the same reference numerals are used to refer to the same or similar elements throughout the disclosure.

Please refer to FIG. 1, which is a block diagram of a storage device according to an embodiment of the present disclosure; as shown in the figure, the storage device 100 of the present embodiment may comprise a volatile memory 110 (e.g., SRAM, DRAM), a non-volatile memory 120 (e.g., NAND Flash memory) and a controller 130. The volatile memory 110 and the non-volatile memory 120 are electrically coupled to the controller 130, respectively for data communication. The storage device 100 can be a universal serial bus (USB) memory device, a memory card with various interfaces, a universal flash memory (UFS) device, or a solid-state disk (SSD), etc.

The non-volatile memory 120 (e.g., NAND Flash memory) of the present embodiment comprises a plurality of data blocks for storing data, each data block comprises a plurality of physical pages, and each physical page has an individual physical address. The read-write speed of the non-volatile memory 120 is relatively slower than that of the volatile memory 110 when in use, and data stored in the non-volatile memory 120 may be stored for a long time after a power failure. The non-volatile memory 120 of the present embodiment is provided with a predetermined storage area 122 for storing the operation log information of the storage device 100 cached in the volatile memory 110. In one embodiment, the predetermined storage area 122 includes a plurality of data blocks configured in sequence.

The volatile memory 110 of the present embodiment reserves a buffer area 112 (i.e., configuring the buffer area 112 of the volatile memory 110) for caching the operation log information in the storage device 100, and comprises a storage block 114 for storing an area mapping table and a page mapping table, wherein the area mapping table is used to map the logical address and physical address of each data block used to store data in the non-volatile memory 120, and each data block corresponds to a respective page mapping table for storing the association between the logical address of each page and the physical address. The data stored in the volatile memory 110 disappears immediately after a power failure. The volatile memory 110 is used to temporarily store the data required by the controller 130 to perform access operations. After the controller 130 activates the RAM disk 116 on the volatile memory 110, a memory space is divided in the volatile memory 110 for the RAM disk 116 to use.

Figure 2:
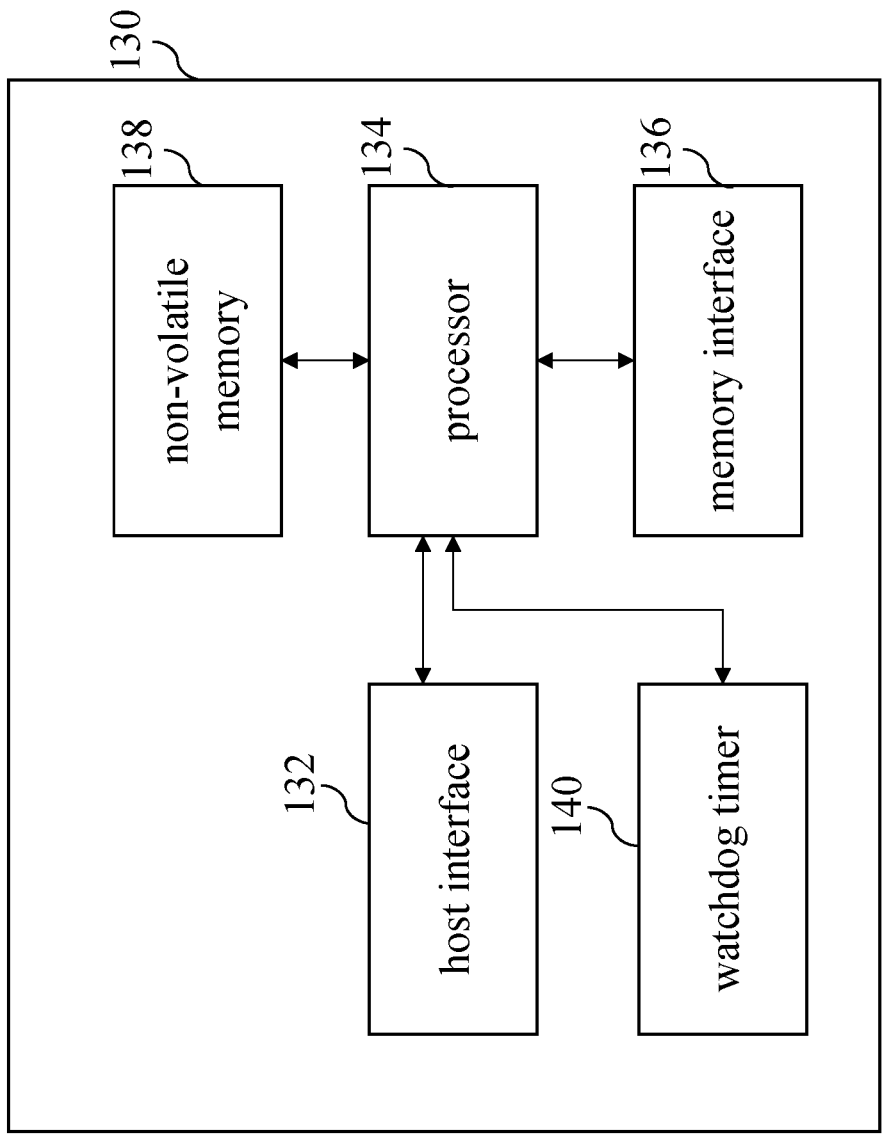
FIG. 2 is a hardware block diagram of a controller according to an embodiment of the present disclosure.

Please refer to FIG. 2, which is a hardware block diagram of a controller according to an embodiment of the present disclosure. The controller 130 may comprise a host interface 132, a processor 134, a flash memory interface 136, a non-volatile memory 138, and a watchdog timer 140. The non-volatile memory 138 (e.g., ROM) is used to store a program code, and the processor 134 performs the method for maintaining the operation log information according to the program code stored in the non-volatile memory 138. The non-volatile memory 138, for example, may be a read-only memory (ROM), an erasable programmable read-only memory (EPROM), or an electronically erasable programmable read-only memory (EEPROM). The processor 134 may be general-purpose hardware (e.g., a single-processor, multi-processor with parallel processing capability, a graphics processor, or other processors with computing capabilities). When loading and executing the program code that implements the method for maintaining the operation log information, the processor 134 completes the method for maintaining the operation log information described below. The host interface 132 may receive commands such as read, write, erase, or other commands, and related parameters and data from an external host through a serial advanced technology attachment (SATA), a peripheral component interconnect express (PCI-E), an interface of a universal serial bus (USB) or associated communication protocols, and then execute the commands and the related parameters accordingly. The flash memory interface 136 is coupled to the non-volatile memory 120, and the processor 134 is coupled to the host interface 132, the flash memory interface 136, the non-volatile memory 138 and the watchdog timer 140. The processor 134 may communicate with the host through the host interface 132 and communicate with the non-volatile memory 120 through the memory interface 136. The flash memory interface 136 comprises a plurality of registers, so that the processor 134 may adjust the physical configurations of the flash memory interface 136 by changing the contents of the registers. The watchdog timer 140 is used to be started (or enabled) by the processor 134 when the storage device 100 initiates the initialization. When the controller 130 performs a self-detection mode, it will start (or enable) the watchdog timer 140. If the watchdog timer 140 counts a predetermined time in the self-detection mode and the storage device 100 does not complete the initialization (or self-detection) (i.e., it is determined that the flash translation layer of the non-volatile memory 120 is damaged), the processor 134 will reset (or stop) the watchdog timer 140, and the processor 134 is set to perform the force low-level formatting mode (Force LLF mode) due to the flash translation layer of the non-volatile memory 120 is damaged, and the RAM disk 116 is activated on the volatile memory 110, so as to ensure the connection between the storage device 100 and the front-end host can work normally. When the controller 130 determines that the storage device 100 completes the initialization, the processor 134 disables (e.g. regularly restarts) the watchdog timer 140.

In order to solve the problem that the operation log information cannot be read when the flash translation layer of the non-volatile memory 120 is damaged in the prior art as described above, the embodiment of the present disclosure provides a method for maintaining the operation log information. The processor 134 caches the operation log information of the storage device 100 in the buffer area 112 set in the volatile memory 110 in the operation process of the storage device 100, and repeatedly writes the cached operation log information in the fixed location of the non-volatile memory 120 (i.e., the predetermined storage area 122), so that the record of the operation log information is not affected by the file system. The storage block 114 is updated to the non-volatile memory 120 every predetermined time. Since the data in the storage block 114 disappears immediately after power-off, in order to avoid the problem of operation log information disorder after the power-on reset, the processor 134 updates the storage block 114 to the non-volatile memory 120 every predetermined time. In addition, when the storage device 100 initiates the initialization, the watchdog timer 140 of the controller 130 is activated, and cooperates with the self-detection and determination mechanism of the storage device 100. If the watchdog timer 140 is found to count a predetermined time and the storage device 100 does not complete the initialization, the latest operation log information is fetched by reading the predetermined storage area 122 of the non-volatile memory 120 and the storage device 100 is set into be in a force low-level formatting mode after the latest operation log information is fetched, and. When the storage device 100 completes the initialization, the watchdog timer 140 is disabled. whether the flash translation layer of the non-volatile memory 120 is damaged or not, the operation log information may be fetched without disassembling the casing of the storage device 100. Therefore, when an unpredictable phenomenon occurs in the storage device 100 according to the present invention, it can be ensured that the operation log information can be obtained, and An engineer can analyze the cause through the fetched operation log information of the storage device 100. The detailed description is as follows.

Figure 3:
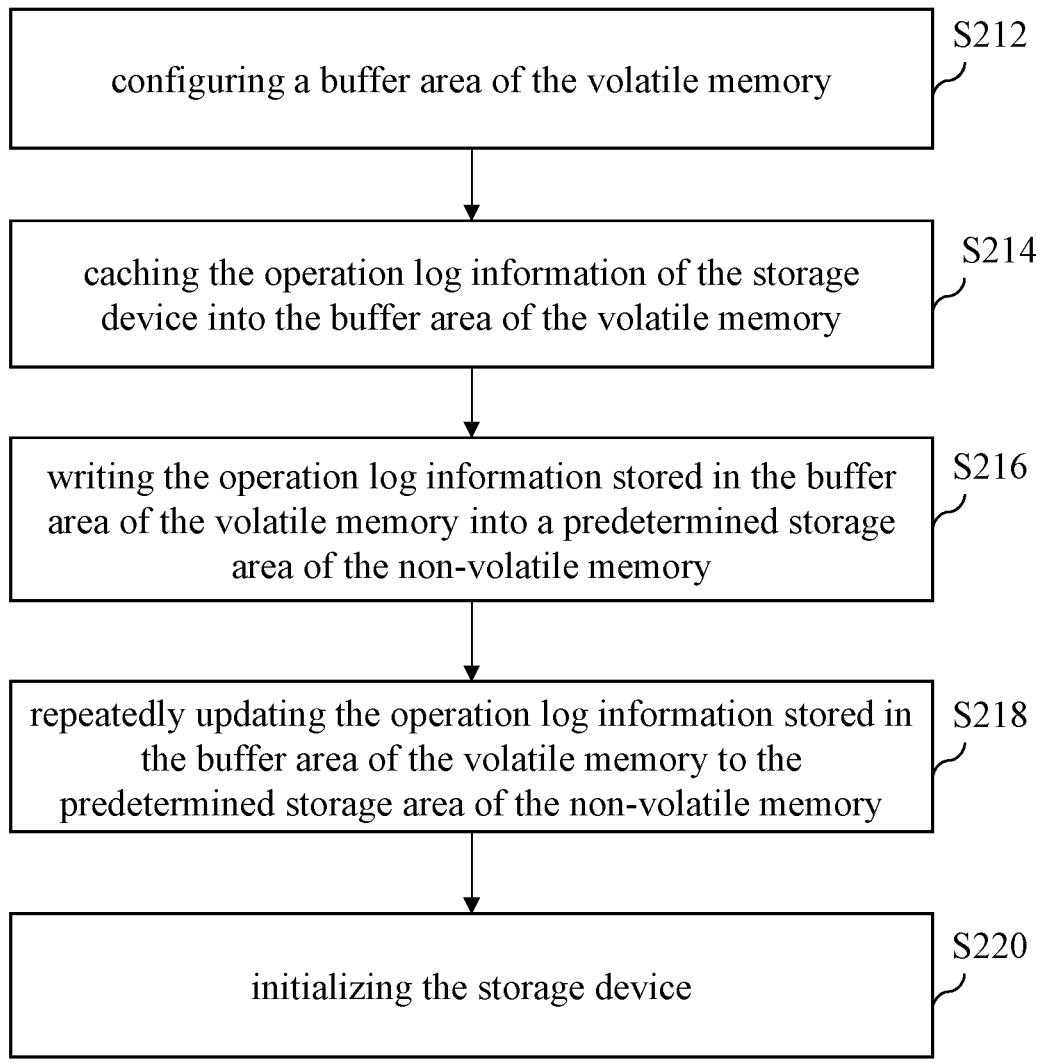
FIG. 3 is a method flowchart of an embodiment of a method for maintaining operation log information according to the present disclosure.

In one embodiment, the processor 134 of the controller 130 loads the program code of the method for maintaining operation log information to implement the method for maintaining operation log information. Please refer to FIG. 3, which is a method flowchart of an embodiment of a method for maintaining operation log information according to the present disclosure. The detailed description is as follows.

The method for maintaining operation log information includes steps S212, S214, S216, S218, and S220.

The step S212 includes configuring a buffer area 112 of the volatile memory 110.

The step S214 includes caching the operation log information of the storage device 100 into the buffer area 112 of the volatile memory 110.

The step S216 includes writing the operation log information stored in the buffer area 112 of the volatile memory 110 into a predetermined storage area 122 of the non-volatile memory 120.

The step S218 includes repeatedly updating the operation log information stored in the buffer area 112 of the volatile memory 110 to the predetermined storage area 122 of the non-volatile memory 120.

The step S220 includes initializing the storage device 100, wherein the step S220 comprises: enabling a watchdog timer 140 in the controller 130; fetching the latest operation log information by reading the predetermined storage area 122 of the non-volatile memory 120 when the watchdog timer 140 counts a predetermined time and the storage device 100 does not complete the initialization; configuring the storage device 100 to perform a force low-level formatting after the latest operation log information is fetched; and disabling (e.g. regularly restarting) the watchdog timer 140 when the storage device 100 completes the initialization.

In an alternative embodiment, the step S220 further comprises the step of determining a flash translation layer in the storage device 100 is damaged when the watchdog timer 140 counts the predetermined time and the storage device 100 does not complete the initialization.

In an alternative embodiment, the step S220 further comprises the step of copying the latest storage block updated in the non-volatile memory 120 to the volatile memory 110, and fetching a location of the predetermined storage area 122 in the non-volatile memory 120 for the next time of writing the operation log information according to an offset value recorded in the storage block 114 copied to the volatile memory 110 when the storage device 100 completes the initialization.

In an alternative embodiment, the method for maintaining operation log information further comprises the step of writing the latest operation log information into the predetermined storage area 122 of the non-volatile memory 120 after the force low-level formatting is completed.

In an alternative embodiment, before the step S214, the method for maintaining operation log information further comprises the steps of configuring an offset value recorded in the storage block 113 of the volatile memory 110 to a default value; and copying the storage block 114 of the volatile memory 110 to the non-volatile memory 120 when the storage device 100 performs the low-level formatting. The default value may be 0, but the present disclosure is not limited thereto.

In an alternative embodiment, the method for maintaining operation log information further comprises the steps of modifying an offset value recorded in the storage block 114 of the volatile memory 110 after the step S216 is completed; and releasing the buffer area 112 of the volatile memory 110, so as to re-cache the operation log information of the storage device 100. Wherein, the offset value corresponds to a location where the operation log information in the buffer area 112 written into the predetermined storage area 122. That is, the processor 134 writes (programs) the operation log information cached in the buffer area 112 into the predetermined storage area 122 of the non-volatile memory 120, specifically, according to the area mapping table and the page mapping table stored in the storage block 114 of the volatile memory 110, writes the operation log information cached in the buffer area 112 into the predetermined storage area 122 of the non-volatile memory 120 in a dynamic offset value manner, and then updates the connection relationship between the logical address and the physical address of the corresponding area mapping table and page mapping table (i.e., modifying the offset value recorded in the storage block 114 of the volatile memory 110 after the writing is completed), so as to then provide a corresponding use when reading and writing.

In an alternative embodiment, the method for maintaining operation log information further comprises the step of finding the latest storage block updated in the non-volatile memory 120 before power-off; and copying the latest storage block to the volatile memory 110 when the storage device 100 is power-on reset after being powered off, so as to fetch thea location of the predetermined storage area 122 in the non-volatile memory 120 for the next time of writing the operation log information according to an offset value recorded in the storage block 114 copied to the volatile memory 110. In addition, the buffer area 112 of the volatile memory 110 is released after the writing is completed to re-cache the operation log information of the storage device 100. Wherein, the predetermined storage area 122 is cyclically used, and if it is written to the end, it is restarted from the beginning.

In an alternative embodiment, the method for maintaining operation log information further comprises the step of writing the operation log information in the buffer area 112 into the predetermined storage area 122 of the non-volatile memory 120 whenever the buffer area 112 is full, modifying an offset value recorded in the storage block 114 of the volatile memory 110 after the step S216 is completed, and releasing the buffer area 112 of the volatile memory 110. In one example, the predetermined storage area 122 of the non-volatile memory 120 comprises a plurality of data blocks, and the size of each data block and the size of the buffer area 112 are the same (e.g., 4 KB), so that whenever the buffer area 112 is full, the operation log information in the buffer block 112 is written into the data blocks of the predetermined storage area 122 of the non-volatile memory 120 arranged in sequence. After the operation log information in the buffer area 112 is written into the last data block of the predetermined storage area 122 of the non-volatile memory 120, the operation log information in the buffer area 112 is written into the first data block of the predetermined storage area 122 of the non-volatile memory 120. In other words, the plurality of data blocks in the predetermined storage area 122 are cyclically used.

Figure 4:
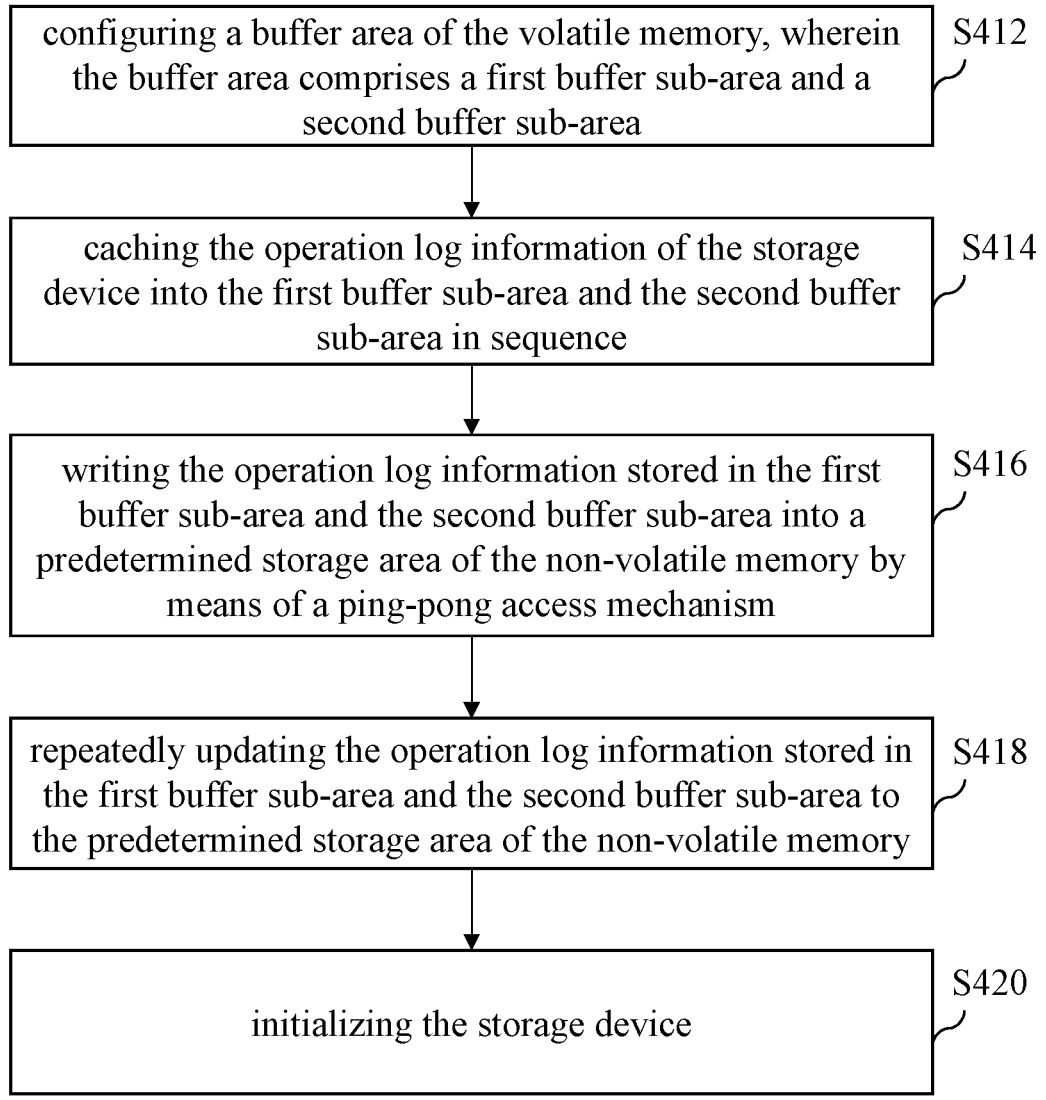
FIG. 4 is a method flowchart of another embodiment of a method for maintaining operation log information according to the present disclosure.

In the above embodiment, since only the buffer area 112 is used to cache the operation log information, there is a problem that part of the operation log information cannot be stored and recorded when the processor 134 writes the operation log information cached in the buffer area 112 into the predetermined storage area 122 of the non-volatile memory 120. In order to solve the problem that part of operation log information cannot be stored and recorded in the above embodiment. In one embodiment, the buffer area 112 may be designed to comprise a first buffer sub-area and a second buffer sub-area, and the operation log information cached in the first buffer sub-area and the second buffer sub-area is written into the predetermined storage area 122 in the non-volatile memory 120 through a ping-pong access mechanism. For details, please refer to FIG. 4, which is a method flowchart of another embodiment of a method for maintaining operation log information according to the present disclosure.

The method for maintaining operation log information includes steps S412, S414, S416, S418, and S420.

The step S412 includes configuring a buffer area 112 of the volatile memory 110, wherein the buffer area 112 comprises a first buffer sub-area and a second buffer sub-area.

The step S414 includes caching the operation log information of the storage device 100 into the first buffer sub-area and the second buffer sub-area in sequence.

The step S416 includes writing the operation log information stored in the first buffer sub-area and the second buffer sub-area into a predetermined storage area 122 of the non-volatile memory 120 by means of a ping-pong access mechanism.

For example, the operation log information may be first cached into the first buffer sub-area. when the first buffer sub-area is full, the operation log information is cached into the second buffer sub-area, and the operation log information filled in the first buffer sub-area is written into the predetermined storage area 122 of the non-volatile memory 120 simultaneously. Then, the first buffer sub-area of the volatile memory 110 is released after the writing. When the second buffer sub-area is full, the operation log information is cached into the first buffer sub-area (the first buffer sub-area may be released before the second buffer sub-area is filled with the operation log information), the operation log information filled in the second buffer sub-area is written into the predetermined storage area 122 of the non-volatile memory 120 simultaneously. Then, the second buffer sub-area of the volatile memory 110 is released after the writing is completed.

The step S418 includes repeatedly updating the operation log information stored in the first buffer sub-area and the second buffer sub-area to the predetermined storage area 122 of the non-volatile memory 120.

The steps S420 and S220 are the same, and therefore, the description is not repeated herein.

In an alternative embodiment, the method for maintaining operation log information further includes the step of writing the latest operation log information into the predetermined storage area 122 of the non-volatile memory 120 after the force low-level formatting is completed.

In an alternative embodiment, the method for maintaining operation log information further includes the steps of modifying an offset value recorded in the storage block 114 of the volatile memory 110 after the step of writing the operation log information stored in the first buffer sub-area or the second buffer sub-area into the predetermined storage area 122 of the non-volatile memory 120 is completed. Wherein, the offset value corresponds to a location where the operation log information in the first buffer sub-area or the second buffer sub-area written into the predetermined storage area 122.

In an alternative embodiment, the method for maintaining operation log information further includes the step of finding the latest storage block updated in the non-volatile memory 120 before power-off and copying the latest storage block to the volatile memory 110 when the storage device 100 is power-on reset after being powered off, so as to fetch thea location of the predetermined storage area 122 in the non-volatile memory 120 for the next time of writing the operation log information according to an offset value recorded in the storage block 114 copied to the volatile memory 110.

To sum up, the present disclosure provides a method for maintaining operation log information and a storage device. In the operation process of the storage device, the operation log information is recorded in a fixed location of the non-volatile memory (i.e., the predetermined storage area), so that the recording of the operation log information is not affected by the file system. In the meanwhile, the watchdog timer is used to operate during initialization of the storage device and cooperate with the self-detection determination mechanism of the storage device. If the storage device is found not to complete the initialization within the predetermined time, the storage device is set to be in a force low-level formatting mode, the predetermined storage area of the non-volatile memory is directly read and the latest operation log information is fetched before the storage device performs the force low-level formatting mode, so as to ensure that the operation log information of the storage device may be directly fetched if the disk of the storage device cannot be recognized (e.g., the flash translation layer is damaged). Therefore, when an unpredictable phenomenon occurs in the storage device, the operation log information may be fetched, and the cause may be analyzed through the fetched operation log information.

All or part of the steps in the method of the present disclosure may be implemented by a computer program, such as a computer operating system, a specific hardware driver in the computer, or a software program. In addition, it may also be implemented in other types of programs as shown above. Those skilled in the art may compose the method of the embodiment of the disclosure into a computer program, and the computer program is not described again for the sake of brevity. The computer program implemented according to the method of the embodiment of the present disclosure may be stored in a suitable computer readable medium, such as DVD, CD-ROM, USB, hard disk, or placed on a network server that may be accessed via the network (e.g., the Internet, or other suitable carrier).

Although the above-described components are comprised in the drawings of the present application, it is not excluded that, without violating the spirit of the disclosure, more other additional components are used to achieve better technical effects. In addition, although the flowchart of the present application is performed in a specified order, those skilled in the art may modify the order of these steps without violating the spirit of the disclosure, so the present disclosure is not limited to using only the sequence described above. Furthermore, those skilled in the art may also integrate several steps into one step, or perform more steps in sequence or in parallel, and the present disclosure is not limited thereby.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A method for maintaining operation log information stored in a non-volatile memory of a storage device, the storage device comprising a volatile memory, the non-volatile memory and a controller, the method comprising:
configuring a buffer area of the volatile memory;
caching the operation log information of the storage device into the buffer area of the volatile memory;
writing the operation log information stored in the buffer area of the volatile memory into a predetermined storage area of the non-volatile memory;
repeatedly updating the operation log information stored in the buffer area of the volatile memory to the predetermined storage area of the non-volatile memory; and
initializing the storage device, wherein the step of initializing the storage device comprises:
enabling a watchdog timer in the controller;
fetching the latest operation log information by reading the predetermined storage area of the non-volatile memory when the watchdog timer counts a predetermined time and the storage device does not complete the initialization;
configuring the storage device to perform a force low-level formatting after the latest operation log information is fetched; and
disabling the watchdog timer when the storage device completes the initialization.

2. The method of claim 1, further comprising:
writing the latest operation log information into the predetermined storage area of the non-volatile memory after the force low-level formatting is completed.

3. The method of claim 1, further comprising:
modifying an offset value recorded in a storage block of the volatile memory after the step of writing the operation log information into the predetermined storage area of the non-volatile memory is completed; and
releasing the buffer area of the volatile memory, so as to re-cache the operation log information of the storage device;
wherein the offset value corresponds to a location where the operation log information in the buffer area written into the predetermined storage area.

4. The method of claim 1, wherein the step of initializing the storage device further comprises: determining a flash translation layer in the storage device is damaged when the watchdog timer counts the predetermined time and the storage device does not complete the initialization.

5. The method of claim 1, wherein before the step of caching the operation log information of the storage device into the buffer area of the volatile memory, the method further comprises:
configuring an offset value recorded in a storage block of the volatile memory to a default value and copying the storage block of the volatile memory to the non-volatile memory when the storage device performs the low-level formatting.

6. The method of claim 1, wherein the step of initializing the storage device further comprises:
copying the latest storage block updated in the non-volatile memory to the volatile memory, and fetching a location of the predetermined storage area in the non-volatile memory for the next time of writing the operation log information according to an offset value recorded in a storage block copied to the volatile memory when the storage device completes the initialization.

7. The method of claim 1, further comprises:
finding the latest storage block updated in the non-volatile memory before power-off and copying the latest storage block to the volatile memory when the storage device is power-on reset after being powered off, so as to fetch a location of the predetermined storage area in the non-volatile memory for the next time of writing the operation log information according to an offset value recorded in a storage block copied to the volatile memory.

8. The method of claim 1, wherein the buffer area comprises a first buffer sub-area and a second buffer sub-area.

9. The method of claim 1, further comprises:
writing the operation log information in the buffer area into the predetermined storage area of the non-volatile memory whenever the buffer area is full, modifying an offset value recorded in a storage block of the volatile memory after the step of writing the operation log information into the predetermined storage area of the non-volatile memory is completed, and releasing the buffer area of the volatile memory.

10. A storage device comprising:
a volatile memory;
a non-volatile memory;
a controller, respectively coupled to the volatile memory and the non-volatile memory, wherein the controller is configured to:
configure a buffer area of the volatile memory;
cache operation log information into the buffer area of the volatile memory;
write the operation log information stored in the buffer area into a predetermined storage area of the non-volatile memory; and
repeatedly update the operation log information stored in the buffer area of the volatile memory to the non-volatile memory;
wherein when the storage device initiates initialization, the controller is configured to:
enable a watchdog timer in the controller;
fetch the latest operation log information by reading the predetermined storage area of the non-volatile memory when the watchdog timer counts a predetermined time;
configure the storage device to perform a force low-level formatting after the latest operation log information is fetched; and
disable the watchdog timer when the initialization of the storage device is completed.

11. The storage device of claim 10, wherein the controller is further configured to write the latest operation log information into the predetermined storage area of the non-volatile memory after the force low-level formatting is completed.

12. The storage device of claim 10, wherein the controller is further configured to modify an offset value recorded in a storage block of the volatile memory after writing the operation log information into the predetermined storage area of the non-volatile memory, and release the buffer area of the volatile memory, so as to re-cache the operation log information of the storage device, wherein the offset value corresponds to a location where the operation log information in the buffer area written into the predetermined storage area.

13. The storage device of claim 10, wherein the controller is further configured to determine a flash translation layer in the storage device is damaged when the watchdog timer counts the predetermined time and the storage device does not complete the initialization.

14. The storage device of claim 10, wherein the controller is further configured to configure an offset value recorded in a storage block of the volatile memory to a default value and copy the storage block of the volatile memory to the non-volatile memory when the storage device performs the low-level formatting.

15. The storage device of claim 10, wherein the controller is further configured to copy the latest storage block updated in the non-volatile memory to the volatile memory, and fetch a location of the predetermined storage area in the non-volatile memory for the next time of writing the operation log information according to an offset value recorded in a storage block copied to the volatile memory when the storage device completes the initialization.

16. The storage device of claim 10, wherein the controller is further configured to find the latest storage block updated in the non-volatile memory before power-off and copy the latest storage block to the volatile memory when the storage device is power-on reset after being powered off, so as to fetch a location of the predetermined storage area in the non-volatile memory for the next time of writing the operation log information according to an offset value recorded in a storage block copied to the volatile memory.

17. The storage device of claim 10, wherein the buffer area comprises a first buffer sub-area and a second buffer sub-area.

18. The storage device of claim 10, wherein the controller is further configured to write the operation log information in the buffer area into the predetermined storage area of the non-volatile memory whenever the buffer area is full, modify an offset value recorded in a storage block of the volatile memory after the controller writing the operation log information into the predetermined storage area of the non-volatile memory, and release the buffer area of the volatile memory.

* * * * *